(12) United States Patent
Taylor

(10) Patent No.: US 7,967,219 B1
(45) Date of Patent: Jun. 28, 2011

(54) THRUST NOZZLE FOR A GAS TURBINE ENGINE

(75) Inventor: Maurice Ian Taylor, Allestree (GB)

(73) Assignee: Rolls-Royce Limited, London (GB)

( * ) Notice: Subject to any disclaimer, the term of this patent is extended or adjusted under 35 U.S.C. 154(b) by 0 days.

(21) Appl. No.: 06/116,026

(22) Filed: Jan. 11, 1980

(30) Foreign Application Priority Data

Jan. 12, 1979 (GB) .................................. 7901325

(51) Int. Cl.
*B63H 11/10* (2006.01)
*B64C 15/00* (2006.01)
(52) U.S. Cl. .................................................. 239/265.19
(58) Field of Classification Search .............. 60/771, 60/770, 226.3; 239/265.39, 265.19; 244/12.5, 244/23 D
See application file for complete search history.

(56) References Cited

U.S. PATENT DOCUMENTS 3,310,951 A * 3/1967 Marchant ................. 239/265.19
3,687,293 A * 8/1972 Shipman .................. 239/265.27
* cited by examiner

*Primary Examiner* — Timothy D Collins
*Assistant Examiner* — Monica Williams
(74) *Attorney, Agent, or Firm* — Oliff & Berridge, PLC

(57) ABSTRACT

Elbow nozzles in VTOL aircraft engines, are highly stressed when operating, in that they act as high pressure vessels. The invention provides a means for varying the outlet area of such a nozzle without weakening its structure. A single flap is inserted inside the nozzle and connected to the nozzle extremity for pivoting about an axis which lies across the outlet between a position wherein its edges seal against the nozzle side and so restrict the nozzle outlet area and, a position wherein it lies parallel with a wall of the nozzle so that exhaust gas can pass both sides and out of a bigger outlet.

4 Claims, 1 Drawing Sheet

THRUST NOZZLE FOR A GAS TURBINE ENGINE

This invention concerns a thrust nozzle for a gas turbine engine.

More specifically, the invention is concerned with a thrust nozzle, the outlet area of which can be varied, so as to cater for varying volumes of gas flow from a gas turbine engine which includes the nozzles.

The invention seeks to provide a variable area nozzle structure suitable for use as inter alia, a thrust vectoring nozzle i.e. one which is rotatable so as to emit propulsive gas flow in various directions.

According to the present invention, there is provided a variable area thrust nozzle comprising a tubular structure curved in cross-section having an exhaust gas outlet, a flap mounted by one end, within the tubular structure about an axis which lies across said outlet, for pivoting movement about said axis between a position wherein said flap slopes towards a wall of said tubular structure and has its edges in sealing contact therewith and, a position wherein said flap lies parallel with said walls and moving means for achieving said movement.

The tubular structure may be circular in cross section.

Preferably the tubular structure comprises an elbow having that end remote from the exhaust gas outlet, adapted for connection to gas turbine engine structure for rotation relative thereto.

Figure 1:
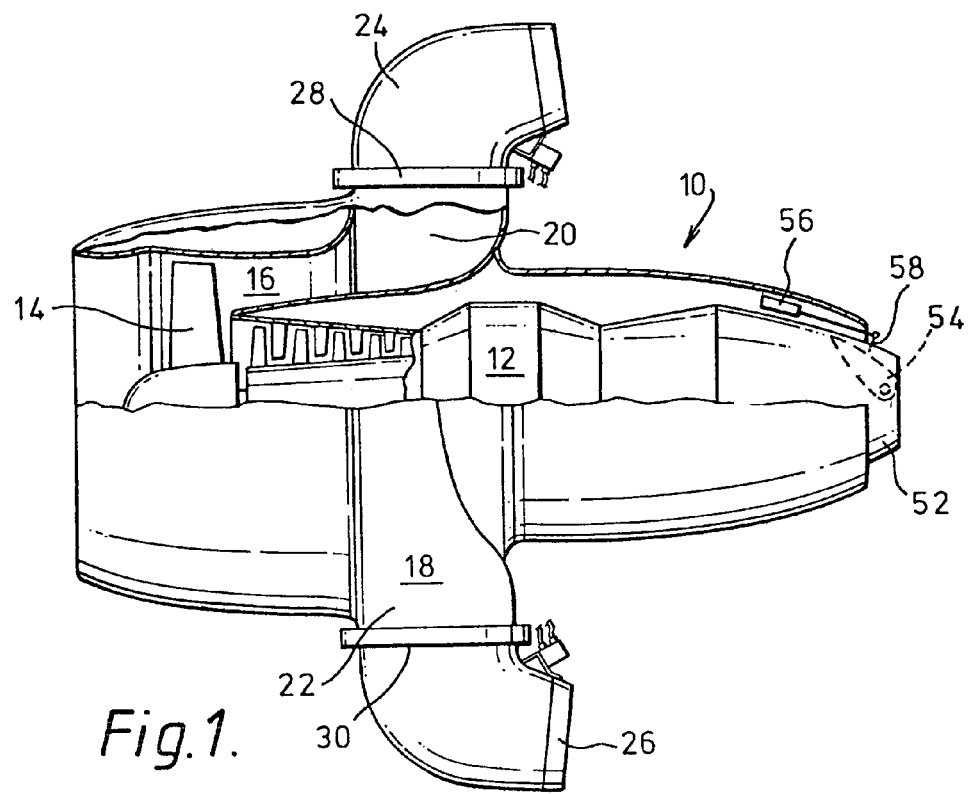
Figure 2:
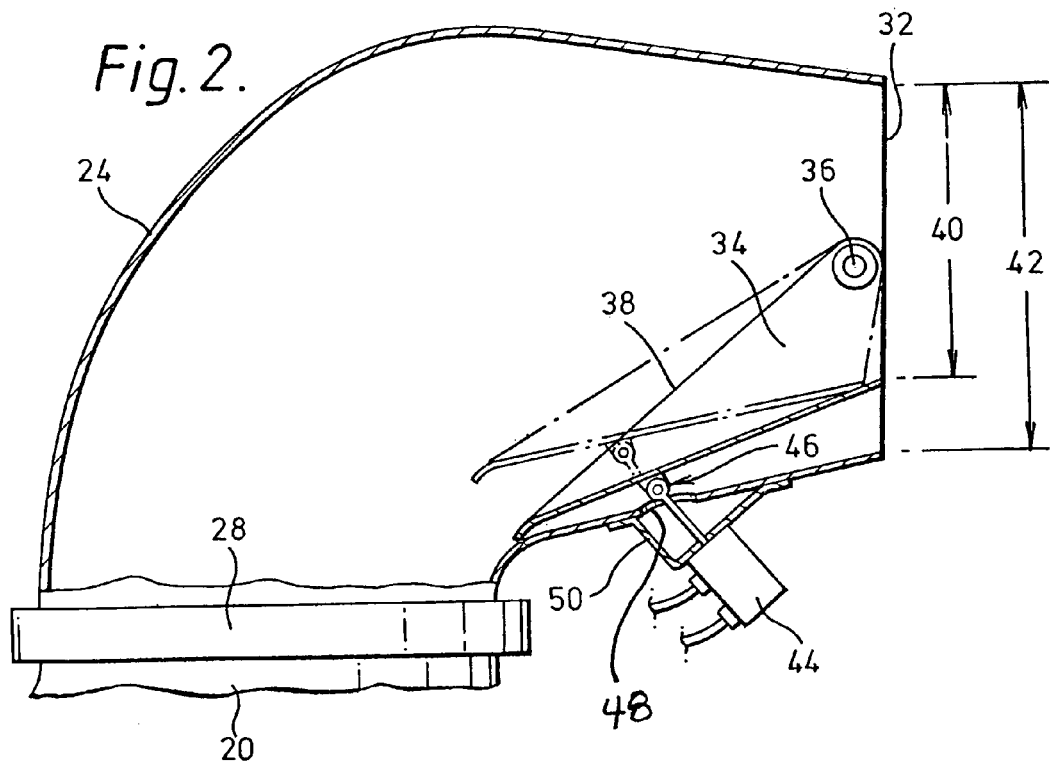

The invention will now be described, by way of example and with reference to the accompanying drawings in which:

FIG. 1 is a diagrammatic view of a gas turbine engine incorporating a pair of variable area thrust nozzles in accordance with an embodiment of the invention, FIG. 2 is an enlarged, cross-sectional part view of FIG. 1.

In FIG. 1 an aircraft power plant 10 comprises a core gas generator 12 driving a front fan 14. The fan duct 16 of front fan 14 terminates in a plenum chamber 18. The plenum chamber is divided into two portions 20, 22 each of which terminates in a respective propulsion nozzle 24, 26.

Propulsion nozzles 24, 26 are rotatable relative to the power plant 10, so as to enable thrust vectoring. In each nozzle, rotation is achieved by connecting the nozzles 24, 26 to the divided portions 20, 22 of plenum chamber 18, via bearings in respective housings 28, 30.

Reheat equipment (not shown) is included in the plenum chamber 18 and operation of the reheat equipment requires the ability to increase the outlet area of each nozzle 24, 26 so as to cater for the resultant increased mass flow of gases.

Referring now to FIG. 2, nozzle 24 is in the form of an elbow, so that its outlet 32 is in a plane which is approximately normal to the plane of rotation of the nozzle. A flap 34 is pivotally mounted at 36 in this nozzle 24 and its length extends inwardly from the outlet of the nozzle structure. The edge periphery 38 defining the side and upstream edges of flaps 34 is so shaped that when the flap is in the position shown in full lines, the edge periphery 38 seals against the curved inner wall of the nozzle. The effective outlet therefore, has a depth indicated between arrowheads 40. In the configuration first described, the outlet area of nozzle 24 is the smallest possible, but should re-heat be required, that area will not be sufficient to pass the resultant increase in mass flow of the gas. Accordingly, flap 34 is pivoted to the position shown in dotted lines. Gas can then flow past both sides of flap 34, to the outlet plane 32 the depth of which has now been enlarged as indicated by the distance between arrowheads 42.

In the present example, a ram 44 is used to move the flap 34 between its two positions. The ram 44 is connected to the underside of flap 34 via a link and pin arrangement 46. However, any suitable linear actuator may be utilised.

A hole 48 is provided to enable the link portion of the connection 46 to pass through. However, in the "reheat" configuration, no gas will escape to atmosphere via hole 48, as a sole plate 50 seals the hole therefrom. The sole plate also serves to locate ram structure 44.

The construction of area varying apparatus described hereinbefore, is particularly suitable for employment with elbow type nozzles, in that it can be positioned in the crook of the elbow, as shown and so does not add to the frontal area of the power plant it is mounted upon. Moreover, mounting the apparatus thus does not affect the structural integrity of the outer portion of the elbow, which in operation, is subject to the temperature and turning force of the gas flow. However, as can be seen in FIG. 1, the apparatus can be utilised on a straight nozzle.

In FIG. 1 the outlet nozzle 52 of gas generator 12, has a flap 54 mounted therein in a manner identical with the flap 34 of FIG. 2. A ram mechanism 56 lies along the exterior of nozzle 52 and is connected to flap 54 via a link 58.

Actuation of ram 56 pivots link 58 which in turn pivots flap 54 into the "reheat on" position.

As link 58 will pivot about one portion of an arc and flap 54 will pivot about another portion of arc, the connection between them will have to comprise a pin and slot connection, to cater for the different movements.

I claim:

1. A variable area thrust nozzle for a gas turbine engine comprising:
   a tubular structure curved in cross-section and having an interior wall terminating in an exhaust gas outlet at its downstream end;
   means within said tubular structure for varying the area of said exhaust gas outlet, said means including a flap having a pivotal connection at its downstream end to said tubular structure on an axis extending across said exhaust gas outlet adjacent the downstream end thereof, said flap extending from said pivotal connection in an upstream direction within the tubular structure; and
   means to move said flap between a first position where the area of said exhaust gas outlet is smallest and a second position where the area of said exhaust gas outlet is maximum, said flap having a shape where its wall slopes toward the wall of said tubular structure and its side and upstream edges are in sealing contact with the wall of said tubular structure when in the first position and where its wall is parallel with and spaced from the wall of said tubular structure when in the second position.

2. A variable area thrust nozzle as claimed in claim 1 wherein the tubular structure is circular in cross section.

3. A variable area thrust nozzle as claimed in claim 2 wherein the tubular structure comprises an elbow having that end remote from the exhaust gas outlet, adapted for connection to gas turbine engine structure for rotation relative thereto.

4. A variable area thrust nozzle as claimed in claim 1 wherein the tubular structure comprises an elbow having that end remote from the exhaust gas outlet, adapted for connection to gas turbine engine structure for rotation relative thereto.

* * * * *